United States Patent Office 3,411,147 Patented Nov. 12, 1968

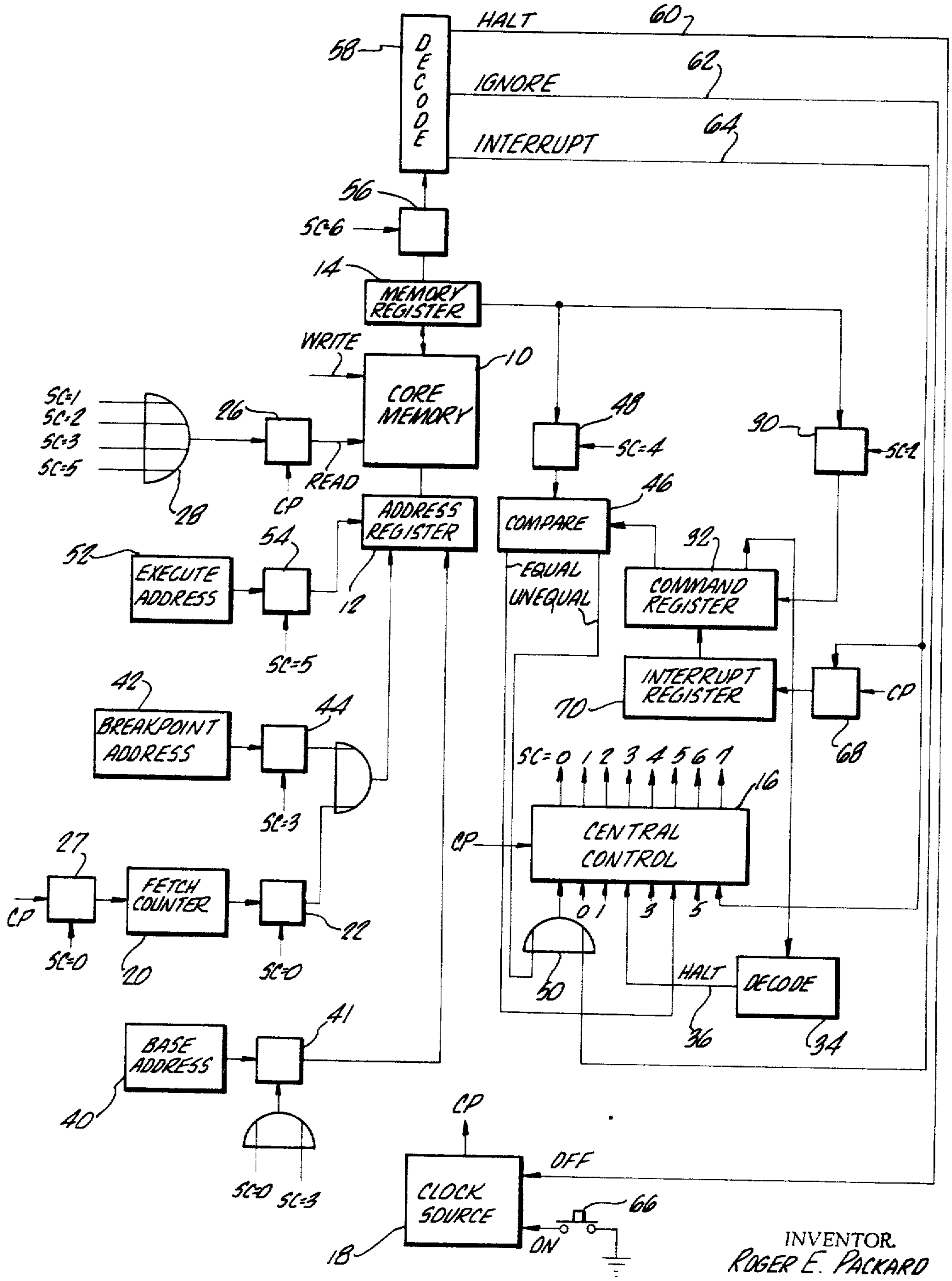
INVENTOR.
ROGER E. PACKARD
BY
Christie, Parker & Hale
ATTORNEYS

3,411,147

APPARATUS FOR EXECUTING HALT INSTRUCTIONS IN A MULTI-PROGRAM PROCESSOR

Roger E. Packard, Glendora, Calif., assignor to Burroughs Corporation, Detroit, Mich., a corporation of Michigan Filed Mar. 24, 1966, Ser. No. 537,172
10 Claims. (Cl. 340—172.5)

This invention relates to electronic digital processors and, more particularly, is concerned with an improved Halt instruction for providing a selective halt operation in the multi-program computer.

The use of a Halt instruction in an internally programmed digital computer is well known. When encountered in a program, the Halt instruction stops all operation of the computer. It is particularly useful in debugging programs and in various test routines. However, the use of a Halt instruction where multiple programs are being run under control of a master control program presents a problem in that the Halt instruction in any program stops all operation of the computer. This may result in a failure in another program which is time dependent, for example, a program which operates in a flow mode, such as a check sorting operation.

It has heretofore been proposed to provide a lock-out arrangement, such as a switch on the control panel which can be set to execute all Halt instructions or may be set to ignore all Halt instructions. Under such an arrangement, however, there is still an opportunity for a Halt instruction to be executed at a time when it results in failure in another program.

The present invention provides an improved Halt instruction in which the Halt instruction results in a comparison between a pattern of bits, called the Breakpoint bits, stored as part of the instruction with a field in memory reserved for each object program. If the comparison is unequal, the Halt instruction is ignored and the next instruction in the program is executed in normal manner. However, if a comparison exists, the Halt instruction results in addressing of digits in a field within the master control program stored in the memory of the computer. These digits, called the Execution digits, determine what further operation is to take place under the Halt instruction. For example, the Execution digits may specify that a Halt operation be executed, resulting in further operation of the computer being stopped, or they might require that the Halt instruction be ignored, in which case the program goes on to the next instruction, or they may specify an interrupt condition in which operation of the computer is switched to a different program segment. Since the master control program knows the state of all programs being run, the Execution digits may be adjusted under dynamic control to permit the proper handling of a Halt instruction when it is encountered.

For a more complete understanding of the invention, reference should be made to the accompanying drawing wherein the single figure is a block schematic diagram of a portion of a processor incorporating the features of the present invention.

Referring to the drawing in detail, the numeral 10 indicates generally an addressable storage device such as a core memory in which may be stored the master control program, one or more object programs as well as data to be used in executing the various programs. The core memory 10 includes an address register 12 and a buffer memory register 14. In response to a pulse applied to the Read input to the memory 10, the word stored in the memory location identified by the contents of the address register 12 is transferred to the buffer register 14. Similarly, in response to a pulse applied to the Write input of the core memory 10, the contents of the buffer register 14 is placed in the memory location identified by the contents of the address register 12. Such addressable memories are well known in the art and further description is not believed necessary to an understanding of the present invention.

Operation of the processor is under control of a central control unit indicated generally at 16, which is synchronized with a clock pulse source 18. Clock pulses from the source 18 are designated CP in the figure. The central control unit 16 is advanced through a series of states, only those states necessary to an understanding of the present invention being shown as SC=0 through SC=7. It may be assumed that initially the central control unit 16 is in the SC=0 state.

Typically, in the SC=0 state of the central control unit 16, a fetch operation for the next instruction is initiated by the processor. Normally the instructions associated with a particular program are stored in consecutive locations in the memory 10 starting with some base address assigned to the particular program. This base address is stored in a register 40. A fetch counter 20 is used to locate the first instruction in the program starting with the base address and is then counted up consecutively to address the sequence of instructions in that program. Assuming that the fetch counter 20 has been properly set to identify the location of the next instruction in a particular program, the SC=0 state, when applied to a gate 22 and a gate 41, transfers the contents of the fetch counter 20 and the base address register 40 to the address register 12. The next clock pulse causes the fetch counter 20 to be counted up one through a gate 27.

During the SC=1 state of the central control unit 16, a memory Read operation is initiated by gating a clock pulse through a gate 26 to the Read control input of the memory unit 10. The SC=1 state is applied to the gate 26 through a logical "or" circuit 28. Thus the clock pulse at the end of the SC=1 state sets the next instruction in the program into the buffer memory register 14. At the same time, the central control unit 16 is advanced to the SC=2 state.

During the SC=2 state, the instruction in the memory register 14 is transferred by a gate 30 to a command register 32. This completes the fetch operation, which is typical of well known internally programmed digital computers. Assuming that the instruction in this case is a Halt instruction, execution of the Halt instruction then takes place according to the teaching of the present invention in the manner described below.

A decoding circuit 34 senses the digits in the instruction stored in the command register 32 which identify the particular operation to take place. For example, the instruction may call for an arithmetic operation such as an add or subtract, multiply or divide, or some other logical operation which is characteristic of operations performed within the processor. Assuming that the instruction calls for a Halt operation, the decoder energizes an output line 36 which is applied to the central control unit 16 to set it to the SC=3 state.

According to the features of the present invention, at this point in the execution of a Halt instruction, a comparison is made between a pattern of digits within the instruction with a pattern of digits called the Breakpoint bits stored as part of each program in the storage unit 10. The Breakpoint bits are always stored in a predetermined location within each of the programs. For example, the Breakpoint bits may be always stored in the address location 49 within the memory space set aside for the particular program in the memory 10. Thus the addressing of the Breakpoint bits must be relative to the base address assigned to the particular program. The base address is loaded in the base address register 40 at the start of operations, as pointed out above. The relative address of the Breakpoint bits for the particular program is determined by a Breakpoint address register 42 and is the same for all programs. The combined base address and relative address are set into the address register 12 through gates 41 and 44 during the SC=3 state. At the end of the SC=3 state, the clock pulse applied to the gate 26 causes the Breakpoint bits for the particular program to be read into the memory register 14. At the same time, the central control unit 16 is advanced to the SC=4 state.

During the SC=4 state, the Breakpoint bits in the memory register 14 are applied to a comparison circuit 46 through a gate 48 to which the SC=4 state is also applied. The comparison circuit 46 compares the pattern of bits in the register 14 with a pattern of bits in the Halt instruction stored in the command register 32. The two patterns may result in an equal or an unequal condition at the output of the comparison circuit 46. If the bits in the Halt instruction do not compare with the Breakpoint bits stored as part of the program, resulting in an unequal condition at the output of the comparison circuit 46, the processor goes on to the next instruction. To this end, the unequal output of the comparison circuit 46 is applied through a logical "or" circuit 50 to set the central control unit 16 to the SC=0 state. The fetch operation on the next instruction is then insituted in the same manner as described above, using the fetch counter 20.

If, on the other hand, the compare circuit 46 indicates that the Breakpoint bits correspond in pattern to the bits in the Halt instruction in the command register 32, the central control unit 16 is set to the SC=5 state and the execution of the Halt instruction continues.

During the SC=5 state, a new address is set into the address register 12 from an Execute address register 52 through a gate 54. The address stored in the register 52 points to an absolute address in the memory 12 which is assigned to the master control program for the computer. This absolute address location always contains information as to how a Halt instruction is to be handled by the processor. At the end of the SC=5 state, the Execution digits are read out of the absolute address location pointed to by the Execute address register 52, the Execution digits being placed in the memory register 14. At the same time, the central control unit 16 is advanced to the SC=6 state.

During the SC=6 state, a gate 56 applies the Execution digits in the register 14 to a decoding circuit 58. The Execution digits as applied to the decoder 58 may specify one of at least three possible conditions identified by respective output lines 60, 62, and 64 from the decoder 58. The first condition, indicated by a signal on the line 60, calls for halting of the processor. A signal on the output line 62 indicates that the Halt instruction is to be ignored while an output signal on the output line 64 indicates that the execution of the program is to be interrupted and an interrupt routine initiated within the processor.

Assuming that the Execution digits when decoded indicate that the Halt command should be ignored, the signal on the output line 62 of the decoder 58 is used to reset the central control unit 16 back to the SC=0 state, resulting in a fetch of the next instruction in the program being executed. If, on the other hand, the output of the decoder 58 indicates that a Halt is to take place, the signal on the output line 60 is used to turn off the clock pulse source 18 thereby stopping further operation of the processor. Operation can only be restored by turning the clock pulse source on again by means of a manually controlled switch 66, for example.

If the decoder 58 calls for an interrupt condition, the signal on the output line 64 is used to initiate an interrupt routine. The use of interrupt routines in processors is well known. See, for example, copending application Ser. No. 232,016, filed October 22, 1962, and entitled Electronic Digital Computer With Automatic Interrupt Control, filed in the name of William A. Logan et al. and assigned to the same assignee as the present invention. The interrupt output 64 from the decoder 58 establishes a new instruction in the command register 32 by gating a clock pulse through a gate 68 to an interrupt order generating circuit 70 by which the order in the command register 32 is modified to initiate an interrupt routine. At the same time, the central control unit 16 may be set to the SC=7 state, which is used to initiate appropraite action within the processor as required by the interrupt order. The actual interrupt operation forms no part of the present invention and further description is therefore not believed warranted.

What is claimed is:

1. In a processor in which coded instructions are transferred from an addressable storage in predetermined sequence to a command register and executed by the processor through control circuitry responsive to the contents of the command register, apparatus for halting operation of the processor in response to a particular instruction comprising means responsive to a first portion of the contents of the command register for reading out a first word from a predetermined location in memory, means responsive to a second portion of the contents of the command register for generating a group of digits, means comparing selected digits of the first word and said group of digits for equality, means responsive to the comparing means when equality is sensed for reading out a second word from a predetermined location in memory, and means responsive to a first coded condition of the second word for halting further operation of the processor.

2. Apparatus as defined in claim 1 further including means responsive to a second coded condition of the second word for interrupting the sequential transfer of instructions to the command register from memory.

3. Apparatus as defined in claim 1 further including means responsive to a third coded condition of the second word for initiating transfer of the next instruction in said sequence from memory to the command register.

4. Apparatus as defined in claim 1 wherein said means for generating a group of digits includes a portion of the command register, the group of digits being transferred to said portion of the command register as part of said particular instruction for halting further operations of the processor.

5. Apparatus as defined in claim 1 further including a clock pulse source for synchronizing operation of the processor, said means responsive to a first coded condition of the second word for stopping the operation of the clock pulse source.

6. In an internally programmed computer, apparatus for selectively halting the operation in response to a Halt instruction, comprising an addressable memory for storing program instructions and data in addressable storage locations, a command register for storing an instruction, means for transferring instructions in predetermined sequence from memory to the command register, means responsive to an instruction designating a Halt operation in the command register for reading out a first word from a predetermined location in memory, means for comparing a portion of the first word with a portion of said instruction in the command register, means controlled by the comparing means for transferring the next instruction in said sequence to the command register when the comparing means indicates a first comparison condition, decoding means, means controlled by the comparing means for reading out a second word from a predetermined location in memory to the decoding means when the comparing means indicates a second comparison condition, means responsive to the decoding means when said second word indicates a first condition for transferring the next instruction in said sequence to the command register, and means responsive to the decoding means when said second word indicates a second condition for stopping the operation of the computer.

7. Apparatus as defined in claim 6 further including means responsive to the decoding means when said second word indicates a third condition for interrupting the sequential transfer of instructions to the command register and setting a special instruction in the command register.

8. Apparatus as defined in claim 6 further comprising a clock pulse source, the decoder means stopping the clock pulse source when said second word indicates said second condition.

9. Apparatus as defined in claim 6 further including a base address register for storing the address in memory of the first instruction in said sequence, said means for reading out a first word from memory including means for incrementing the base address in said register by a predetermined amount, said first word being addressed in memory by the incremented address, whereby said first word is derived from a location in memory fixed in relation to the base address of the instruction sequence.

10. Apparatus as defined in claim 9 wherein the means for reading out the second word includes means for generating a single predetermined absolute address in memory from which the second word is read out.

References Cited

UNITED STATES PATENTS

| | | | |
|---|---|---|---|
| 3,061,192 | 10/1962 | Terzian | 340—172.5 X |
| 3,289,168 | 11/1966 | Walton et al. | 340—172.5 |
| 3,309,672 | 3/1967 | Brun et al. | 340—172.5 |

PAUL J. HENON, *Primary Examiner.*

P. WOODS, *Assistant Examiner.*